US006969821B2

(12) United States Patent
Mika et al.

(10) Patent No.: US 6,969,821 B2
(45) Date of Patent: Nov. 29, 2005

(54) AIRFOIL QUALIFICATION SYSTEM AND METHOD

(75) Inventors: David P. Mika, Clifton Park, NY (US); Apostolos P. Karafillis, Arlington, MA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/610,731

(22) Filed: Jun. 30, 2003

(65) Prior Publication Data

US 2004/0262277 A1 Dec. 30, 2004

(51) Int. Cl.$^7$ .............................................. B23K 26/02
(52) U.S. Cl. .............................. 219/121.83; 219/121.85
(58) Field of Search ....................... 219/121.83, 121.85, 219/121.73, 121.6

(56) References Cited

U.S. PATENT DOCUMENTS

| | | | |
|---|---|---|---|
| 3,638,464 A | | 2/1972 | Winter et al. ................... 72/53 |
| 4,188,811 A | | 2/1980 | Brimm ........................... 72/63 |
| 4,349,277 A | * | 9/1982 | Mundy et al. ................ 356/604 |
| 4,426,867 A | | 1/1984 | Neal et al. ....................... 72/53 |
| 4,432,220 A | | 2/1984 | Loersch et al. ................. 72/53 |
| 4,771,182 A | | 9/1988 | Fulkerson .................... 250/561 |
| 4,874,031 A | | 10/1989 | Janney ....................... 164/76.1 |
| 4,887,231 A | | 12/1989 | Ratliff et al. ................ 364/564 |
| 4,968,892 A | | 11/1990 | McAtee .................... 250/458.1 |
| 4,970,125 A | | 11/1990 | Janney ........................ 428/579 |
| 5,090,811 A | | 2/1992 | Donaldson .................. 356/376 |
| 5,280,723 A | * | 1/1994 | Aharoni et al. ................ 73/602 |
| 5,500,737 A | | 3/1996 | Donaldson et al. .......... 356/376 |
| 5,525,429 A | * | 6/1996 | Mannava et al. ............ 428/610 |
| 5,576,492 A | | 11/1996 | Phalin .......................... 73/634 |
| 5,589,942 A | | 12/1996 | Gordon ....................... 356/376 |
| 5,675,892 A | * | 10/1997 | Mannava et al. ........... 29/889.1 |
| 5,846,057 A | * | 12/1998 | Ferrigno et al. ........... 416/241 R |
| 5,948,293 A | | 9/1999 | Somers et al. .......... 219/121.85 |

(Continued)

FOREIGN PATENT DOCUMENTS

| | | |
|---|---|---|
| EP | 1081239 | 3/2001 |
| EP | 1 304 446 A1 | 4/2003 |
| EP | 13109632 | 5/2003 |
| WO | 0006969 | 2/2000 |

OTHER PUBLICATIONS

M.Geiger, "Laser Forming—The Forming of Metal Using a Laser Beam", ICMEN 2002—1st International Conference on Manufacturing Engineering. 2002.

*Primary Examiner*—M. Alexandra Elve
(74) *Attorney, Agent, or Firm*—Penny A. Clarke; Patrick K. Patnode

(57) ABSTRACT

A method for qualifying airfoil blades includes securing an airfoil blade into a fixture, taking digital measurements of the airfoil blade, comparing the digital measurements of the airfoil blade with measurements of a target model, calculating deviations between the digital measurements of the airfoil blade and the measurements of the target model, determining a required treatment for the airfoil blade to conform with the measurements of the target model, directing a reworking system to provide the required treatment to the airfoil blade, and repeating the previous steps until it is determined that no further treatment is required. An airfoil qualification system for performing the method for qualifying airfoil blades includes a measurement station, a data processing system in communication with the measurement station and for determining a point deviation from a surface standard point for each of at least a portion of the plurality of surface points and for determining a required treatment of the airfoil, and a reworking station for directing treatments to the airfoil in response to input from the data processing system.

25 Claims, 9 Drawing Sheets

U.S. PATENT DOCUMENTS

| | | | |
|---|---|---|---|
| 5,951,790 A | 9/1999 | Mannava et al. | 148/510 |
| 5,980,101 A | 11/1999 | Unternahrer et al. | 374/32 |
| 6,075,593 A | 6/2000 | Trantow et al. | 356/318 |
| 6,094,260 A | 7/2000 | Rockstroh et al. | 356/35.5 |
| 6,130,400 A | 10/2000 | Rockstroh | 219/121.6 |
| 6,183,882 B1 | 2/2001 | Mannava et al. | 428/614 |
| 6,205,240 B1 | 3/2001 | Pietrzak et al. | 382/152 |
| 6,215,097 B1 | 4/2001 | Mannava | 219/121.69 |
| 6,238,187 B1 * | 5/2001 | Dulaney et al. | 416/241 R |
| 6,333,488 B1 | 12/2001 | Lawrence et al. | 219/121.84 |
| 6,341,936 B1 | 1/2002 | Cowie et al. | 415/1 |
| 6,352,406 B1 | 3/2002 | Clare et al. | 416/61 |
| 6,422,082 B1 * | 7/2002 | Suh | 73/624 |
| 6,441,341 B1 | 8/2002 | Steibel et al. | 219/121.7 |
| 6,479,790 B1 | 11/2002 | Graham et al. | 219/121.85 |
| 6,522,993 B1 * | 2/2003 | Tomko | 702/150 |
| 6,551,064 B1 | 4/2003 | Mannava et al. | 416/223 A |
| 6,594,533 B2 * | 7/2003 | Phillips et al. | 700/90 |
| 6,643,569 B2 * | 11/2003 | Miller et al. | 701/29 |
| 6,701,615 B2 * | 3/2004 | Harding et al. | 29/889.1 |

* cited by examiner

AIRFOIL QUALIFICATION SYSTEM AND METHOD

STATEMENT REGARDING FEDERALLY SPONSORED RESEARCH AND DEVELOPMENT

The U.S. Government may have certain rights in this invention pursuant to contract number 70NANB2H3031 awarded by the National Institute of Standards and Technology, Advanced Technology Program.

BACKGROUND OF THE INVENTION

This invention relates generally to airfoil blades, and, more particularly, this invention relates to an automated airfoil blade qualification system and method.

Aircraft engine compressor blades are manufactured to stringent airfoil tolerances, and all blades must pass a qualification process in which dimensions are checked and, if necessary, are manually brought into compliance. Dimensions of primary interest are section contours, twist, and bow. The qualification process is time-consuming and requires highly skilled labor. In many instances, blades are still deformed by hand. The process adds significantly to the overall manufacturing cost of compressor blades.

Shot peening is used to increase fatigue strength, to relieve tensile stresses that contribute to stress-corrosion cracking, to form and straighten metal parts. In shot peening, spheroidal particles of cast steel, cast iron, glass, etc., are blown or mechanically impelled in a high velocity stream or gravity dropped against the surface to be treated. The individual shot particles produce shallow, rounded overlapping dimples in the surface, stretching it radially from each point of impact and causing cold working and plastic flow. The degree of peening, or peening intensity which may be expressed in terms of Almen arc height, is a function of the weight, size, hardness, and velocity of the peening particles, exposure time, type of substrate, angle of impingement, and various other factors. Shot peening of airfoil blades is capable of producing gentle curvatures in the blades. Shot size selection, intensity, and coverage levels as required to obtain the desired contour may be permitted. Shot size selection depends on type of material, thickness, amount of curvature, and roughness requirements. A highly tapered material may require several shot sizes although this complicates peening machine design.

Laser shock peening or laser shock processing, as it is also referred to, is a process for producing a region of deep compressive residual stresses imparted by laser shock peening a surface area of a workpiece. Laser shock peening typically uses multiple radiation pulses from high power pulsed lasers to produce shock waves on the surface of a workpiece. Laser shock peening, as understood in the art and as used herein, means utilizing a laser beam from a laser beam source to produce a strong localized compressive force on a portion of a surface by producing an explosive force by instantaneous ablation or vaporization of a painted or coated or uncoated surface.

Laser forming is another process for affecting material without hard tooling and with acceptable material degradation levels. Laser forming is a process in which material forming is caused by temperature gradients and thermal stresses produced by absorption of power from a scanning laser beam. Laser forming requires no tooling and has the ability to flatten or adjust parts in a controlled manner. Laser forming originated from the process of flame bending or line heating which uses an oxy-acetylene torch as the heat source. The diffuse nature of the flame makes the process difficult and success relies heavily on operator skill, especially to establish a steep temperature gradient in thin sections and materials with a high thermal conductivity. Most flame bending uses a localized thermal upsetting mechanism. The heating rate can be high when a laser beam irradiates a metallic workpiece and steep thermal gradients are easily achieved. The laser beam creates a very narrow thermal deposition profile in comparison with flame, and has precise power control enabling more exact and detailed geometry to be formed in a repeatable manner.

BRIEF SUMMARY OF THE INVENTION

The above discussed and other drawbacks and deficiencies are overcome or alleviated by a method for qualifying airfoil blades, the method including securing an airfoil blade into a fixture, taking digital measurements of the airfoil blade, comparing the digital measurements of the airfoil blade with measurements of a target model, calculating deviations between the digital measurements of the air foil blade and the measurements of the target model, determining a required treatment for the airfoil blade to conform with the measurements of the target model, directing a reworking system to provide the required treatment to the airfoil blade, and repeating the previous steps until it is determined that no further treatment is required.

In another embodiment, an airfoil qualification system includes a measurement station having means for obtaining spatial position data relative to a fixed reference frame for each of a plurality of points on a surface of an airfoil, a data processing system in communication with the means for obtaining spatial position data, the data processing system having means for receiving the spatial position data and for determining a point deviation from a surface standard point for each of at least a portion of the plurality of surface points and means for determining a required treatment of the airfoil, and a reworking station having means for directing treatments to the airfoil in response to input from the data processing system.

In another embodiment, an airfoil qualification system for measuring and reworking an airfoil includes a measurement and reworking station including a measuring system configured to obtain spatial position data relative to a fixed reference frame for each of a plurality of points on the surface and further including a treatment system for directing altering treatments to the airfoil, a data processing system in communication with the measuring and reworking station, the data processing system including, a mapping module programmed to use the spatial position data to form a three dimensional map of the surface, a deviation determination module programmed to determine a point deviation for each of at least a portion of the plurality of surface points, a required treatment determination module for calculating necessary treatments for bring the airfoil in conformance with a target model, and a treatment control module for providing instructions to the treatment system in the measurement and reworking station.

The above discussed and other features and advantages of the present invention will be appreciated and understood by those skilled in the art from the following detailed description and drawings.

DETAILED DESCRIPTION OF THE INVENTION

An automated airfoil blade qualification method is presented which combines automated measurement technologies with technologies to form parts without the use of dies. The dieless technologies preferably include laser forming, laser shock peening and shot-peen processes, each of which affects part geometry by a surface treatment process. Laser forming operates via temperature gradients and thermal stresses induced by a scanning laser beam. Laser shock peening operates by focusing an intense beam on an area covered with an ablative material, which, when hit, sends intense shock waves into the part. Shot peening is a process that bombards the surface with many small spherical hard particles. All processes result in localized plastic deformation and residual stresses, which then alter the equilibrium shape of the workpiece.

Figure 1:
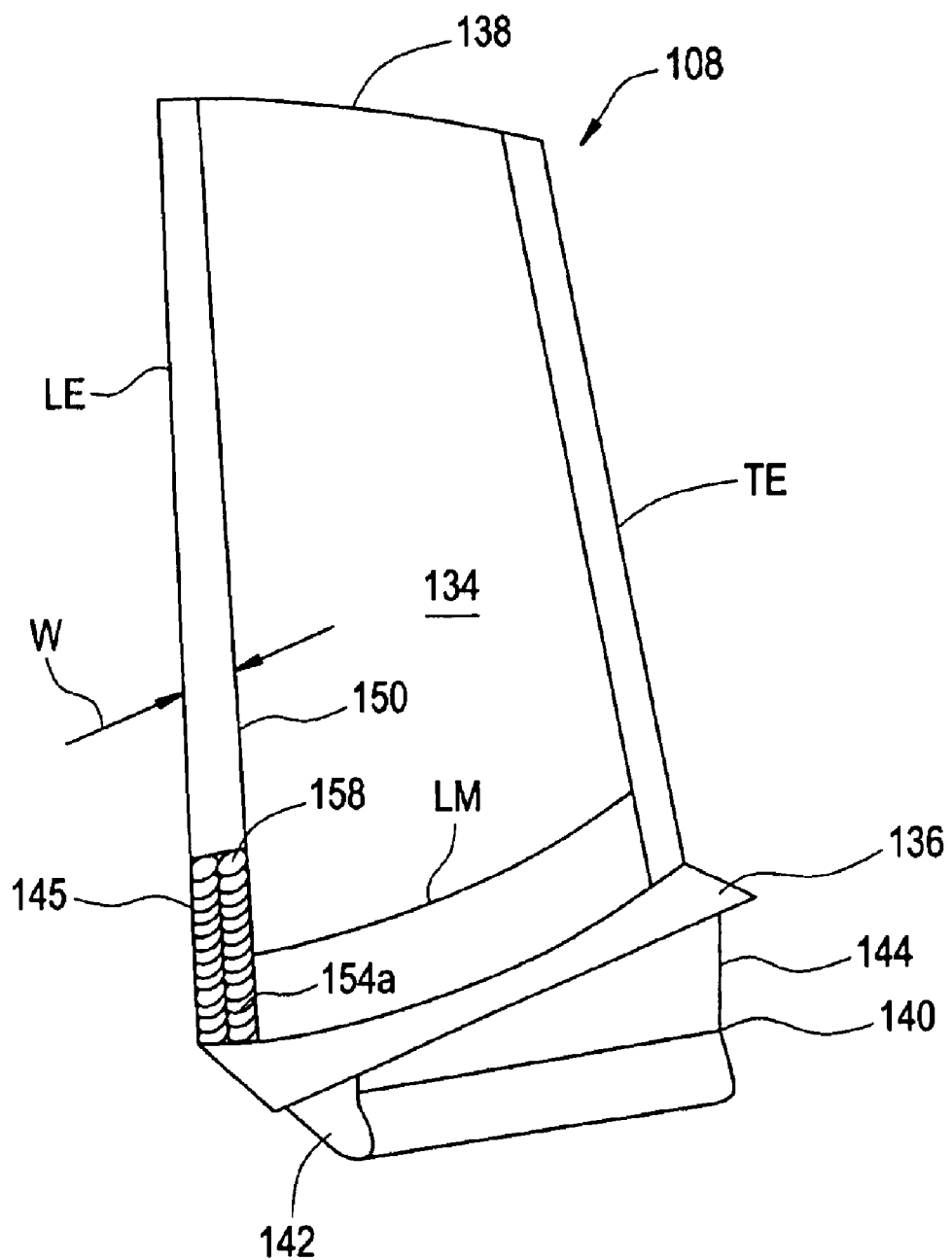
FIG. 1 shows a plan view of an airfoil blade having a laser shock peened portion.
Figure 2:
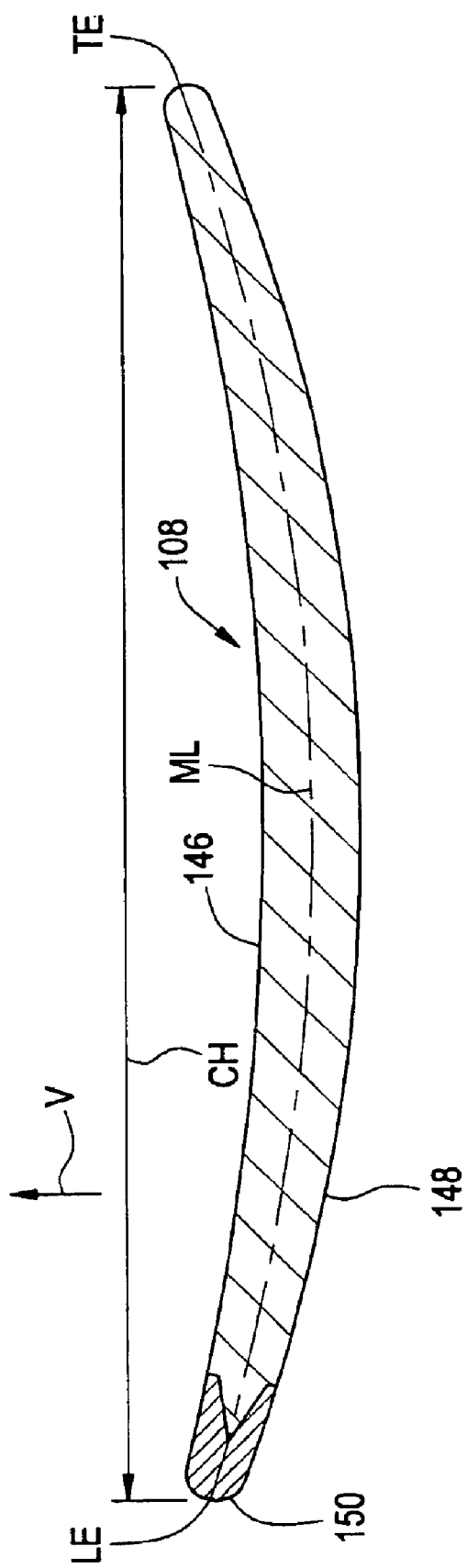
FIG. 2 shows a cross-sectional view of the airfoil blade of FIG. 1.
Figure 3:
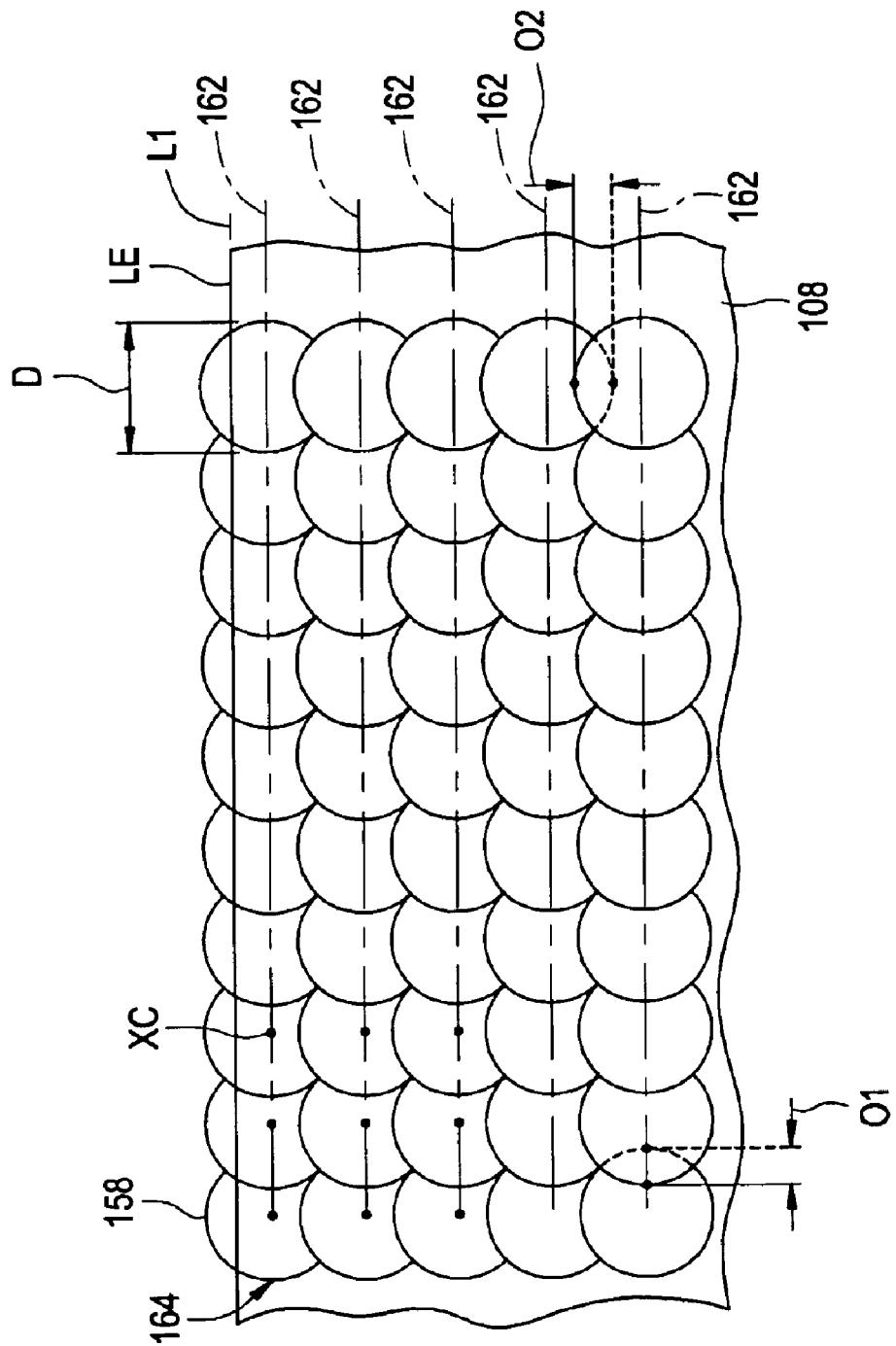
FIG. 3 shows an exemplary laser shock peened surface pattern.

An exemplary embodiment of laser shock peening is shown in FIGS. 1–3. Referring to FIGS. 1–2, an exemplary airfoil blade 108 includes an airfoil 134 extending radially outward from a blade platform 136 to a blade tip 138 and a root section 140 extending radially inward from the platform 136. The root section 140 has a blade root 142 connected to the platform 136 by a blade shank 144. The airfoil 134 extends in the chordwise direction between a leading edge LE and a trailing edge TE of the airfoil. A chord CH of the airfoil 134 is the line between the leading edge LE and trailing edge TE at each cross-section of the blade as illustrated in FIG. 2. A pressure side 146 of the airfoil 134 faces in the general direction of rotation as indicated by an arrow V and a suction side 148 is on the other side of the airfoil and a mean-line ML is generally disposed midway between the two sides in the chordwise direction. The blade 108 has a leading edge section 150 that extends along the leading edge LE of the airfoil 134 from the blade platform 136 to the blade tip 138. The leading edge section 150 includes a predetermined first width W such that the leading edge section 150 encompasses an area where nicks and tears that may occur along the leading edge of the airfoil 134 during engine operation.

Although a particular shape and type of blade 108 is shown, it should be understood that the system of the present invention may employ laser shock peening on a variety of blade shapes and for a variety of types of blades as well as other parts potentially requiring correction. While leading edge section 150 is described, it should be understood that all areas of the airfoil 134 may be measured and corrected using the system of the present invention, and the leading edge section 150 is described for exemplary purposes only. Furthermore, while a laser shock peened patch is disclosed, the present invention employs laser shock peening as a surface treatment for surface profile correction, and therefore the blade 108 may be laser shock peened in areas other than just the leading edge.

FIG. 3 illustrates an exemplary pattern of stacked rows of overlapping laser shock peened circular spots 158 (indicated by the circles). All the laser shocked peened circular spots 158 with their corresponding centers SC lie along a row centerline 162. The pattern of sequences entirely covers the laser shock peening coated surface 155. The laser shocked peened circular spots 158 have a diameter D in a row 164 of overlapping laser shock peened circular spots. The pattern may be of multiple overlapping rows 164 of overlapping shock peened circular spots on the laser shock peening coated surface 155. A first exemplary overlap, illustrated as about 30%, is between adjacent laser shock peened circular spots 158 in a given row. The overlap is typically defined by a first offset O1 between centers XC of the adjacent laser shock peened circular spots 158 and though illustrated as 30% it can vary from about 30% to 50% or more of the diameter D. A second overlap is between adjacent laser shock peened circular spots 158 in adjacent rows and is generally defined by a second offset O2 between adjacent row centerlines 162 and though illustrated as 30% it can vary from about 30% to 50% of the diameter D depending on applications and the strength or fluency of the laser centers XC of adjacent circular spots 158 in adjacent rows are all linearly aligned. While only one particular pattern is specifically described, it should be understood that any other pattern is within the scope of this invention, such as, by example only, the patterns disclosed in U.S. Pat. Nos. 5,591,009, 5,674,329, and 5,674,328, which are herein incorporated by reference in their entirety. Furthermore, any pattern of laser shock peening which will correct the surface and blade as a whole is within the scope of this invention.

Figure 4:
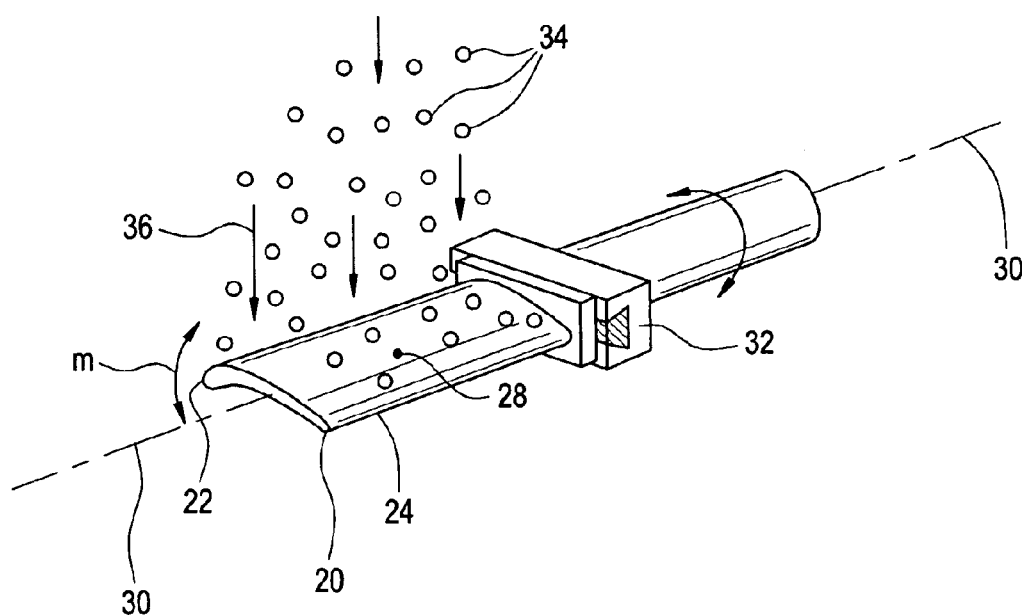
FIG. 4 shows an airfoil blade undergoing a shot peening procedure.

Turning now to FIG. 4, an exemplary embodiment of shot peening is shown. To accomplish shot peening, an airfoil blade 20, having a leading edge 22, a trailing edge 24, a surface 28, and a longitudinal axis 30, is mounted in a holder 32. The shot generally strikes the surface 28, which is shown optionally first to be exposed to the shot stream. The shot may be delivered via gravity or by force, depending on the required surface treatment. In either case, the shot 34 normally is introduced to the blade 20 such that all of the shot 34 is moving along the same streamline 36 and at the same velocity. Alternatively, the shot 34 may be introduced to different portions of the blade 20 at different velocities as required. During peening, the shot is either allowed to strike the entire surface 28 of the airfoil, or selected areas of the airfoil by means of control of the shot steam pattern. The holder 32 may be controlled to rotate in either direction as shown by arrow m, thus simultaneously rotating the blade 20 about its longitudinal axis 30 such that the shot 34 may reach the surface opposite surface 28 of the airfoil blade 20.

Figure 5:
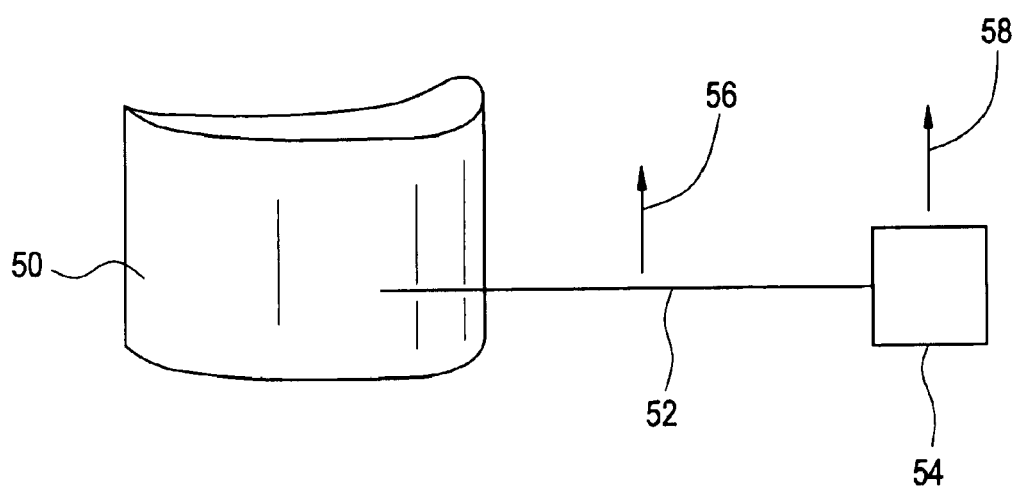
FIG. 5 shows an exemplary laser forming procedure on an airfoil blade.

An exemplary embodiment of laser forming is shown in FIG. 5. An airfoil blade 50, or other suitable part, is scanned with a laser beam 52 emanating from a laser beam source 54. The laser beam 52 preferably moves as shown by exemplary arrow 56. The movement may occur through a movement of the beam 52 itself or via movement of the source 54 as shown by exemplary arrow 58. In either case, the surface of the blade 50 is scanned via the laser beam 52 while the power input, scan rates, scan pattern, cooling rates, etc. are tailored such that permanent deformations are imparted in the blade 50.

As will now be described, the equilibrium shape due to these surface treatments on airfoil blades are calculated by means of computer simulation with finite element methodologies, and algorithms are constructed that output the required surface treatment to yield the target configuration.

Figure 6:
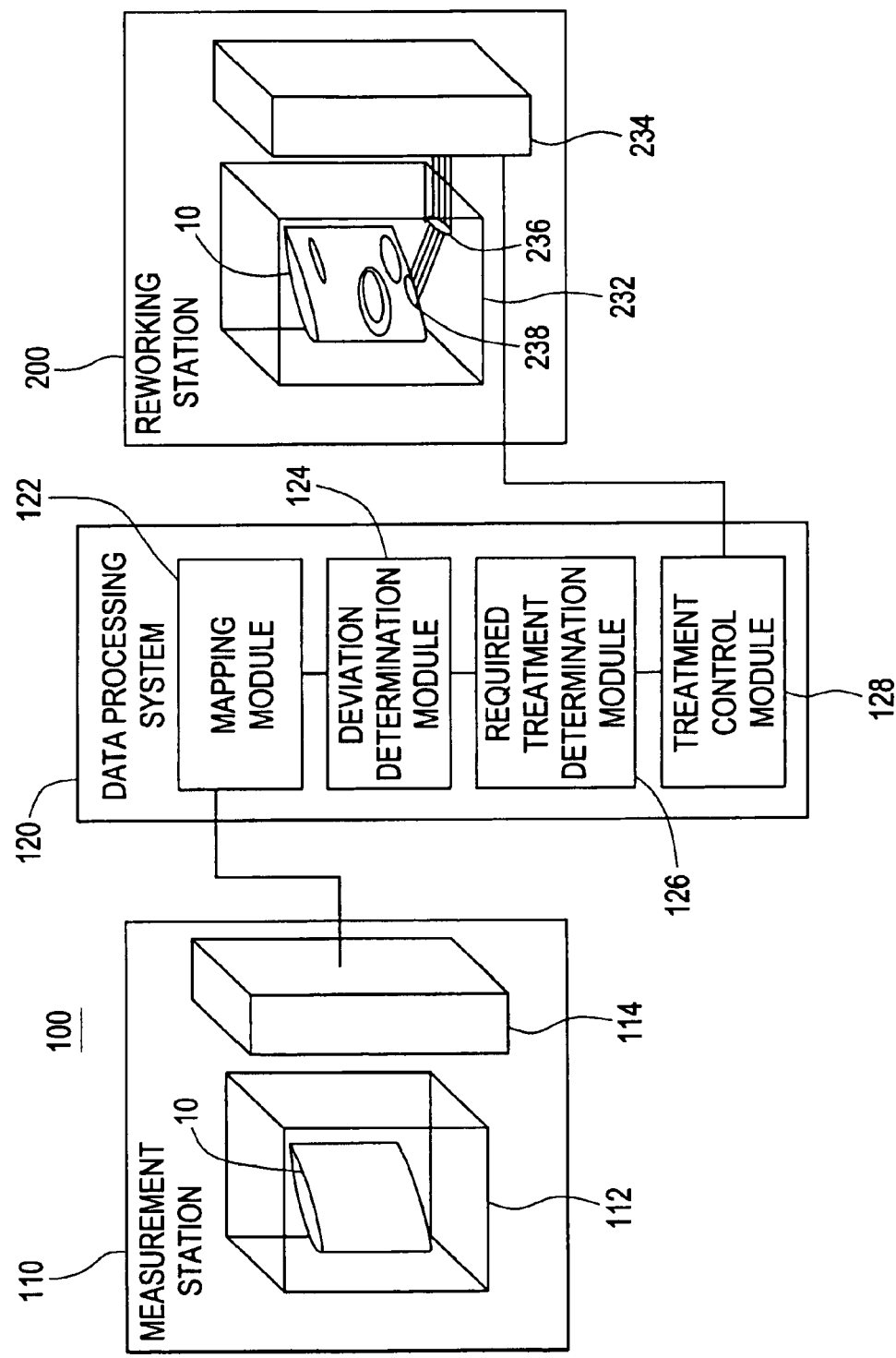
FIG. 6 shows an embodiment of an airfoil blade qualification system.
Figure 7:
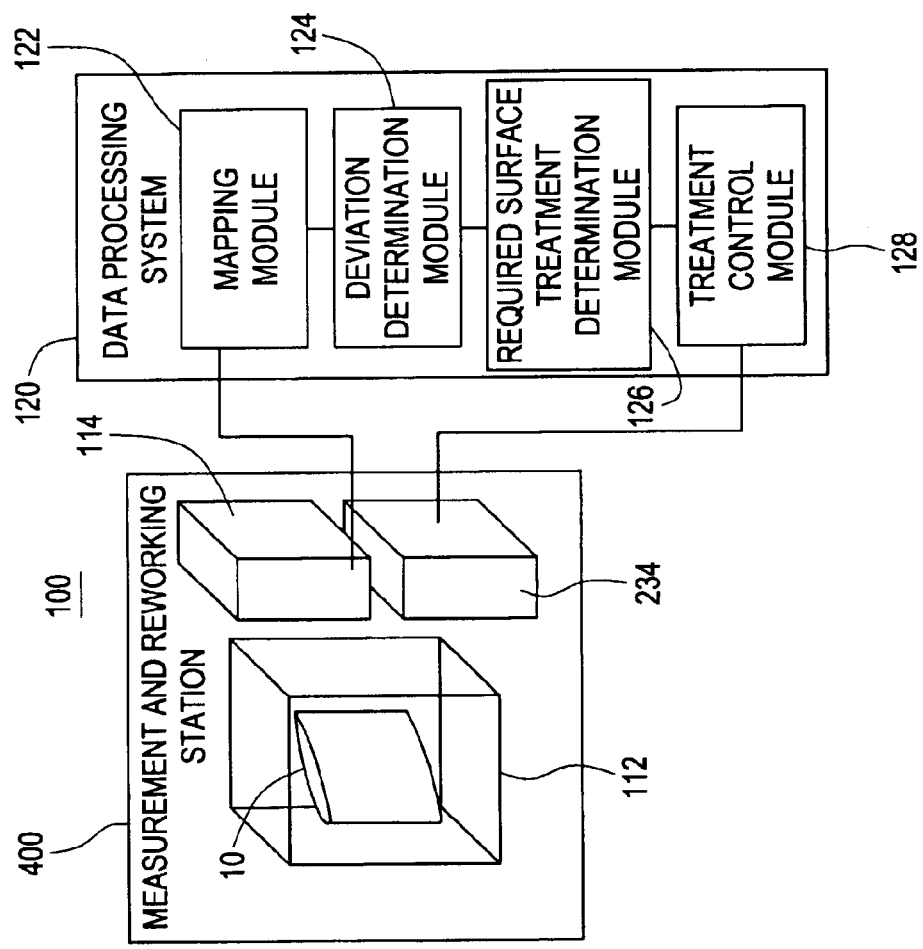
FIG. 7 shows an alternate embodiment of an airfoil blade qualification system.

FIG. 6 illustrates an airfoil blade qualification system 100 that includes a measurement station 110 for obtaining the actual geometry of a part, a data processing system 120 for comparing the measured geometry of the part to a standard and for generating a required surface treatment, and a dieless reworking procedure station 200 for directing the required treatment on the part before rechecking the part via measurement station 110 and data processing system 120. Although measurement station 110 and reworking procedure station 200 are shown separately, these stations may be combined as shown in FIG. 7 such that the airfoil or part being qualified can remain in one station, thus eliminating the need for removal and replacement and removal each time the part needs reworking and remeasuring.

As parts are manufactured, they are passed to the measurement station 110 where sufficient measurements of each part are taken to allow a three dimensional model of the part to be constructed. This model may be a complete model of the part or a model of a particular surface of the part. In either instance, the measurements should be taken relative to a fixed reference frame that is the same for each part. In order to accomplish this, the measurement station 110 of the system 100 may include a high precision fixture 112 configured to hold the part in a particular orientation with respect to the fixed reference frame as measurements are taken.

It will be understood by those of ordinary skill in the art that the higher the number of measurements obtained, the greater the accuracy of the model of the part or surface of the part. Accordingly, the present invention preferably employs optical-based measurements systems for use in modeling the part. A suitable measurement system is described in U.S. Pat. No. 6,522,993, which is herein incorporated by reference. Other suitable systems are described in U.S. Pat. Nos. 5,589,942 and 6,205,240. In any case, a digital measuring system is employed which is capable of measuring all aspects of the part and delivering such measurements as described below. As shown in FIG. 6, the measurement station 110 may include a digital imaging device 114 that can be used to scan one or more surfaces of the part. The digital imaging device 114 can nearly instantaneously capture a series of two dimensional images of a surface that can then be transmitted to the data processor 120 where they are processed to provide a three dimensional map of the surface. An advantage of the optical based system is that it can provide in a matter of seconds a surface map based on thousands of measurement points. It also provides the advantage that measurements can be taken without physical contact with the part. An exemplary digital imaging/optical-based meteorology system that can be used in the present invention is the Optigo™ 100 system of cogniTens 3D Vision Systems Ltd. However, it is within the scope of this invention to employ alternate imaging systems that accomplish the appropriate measurement and information delivery abilities required for the airfoil qualification system.

It would also be within the scope of this invention that other measurement system methodologies may be used to obtain surface measurements from which a three-dimensional map may be derived. These may include laser-based point determination methods, automated mechanical measurement using coordinate measuring machines (CMMs) and simple hand measurement. None of these methods, however, provides the speed and relative precision obtained through the use of optical-meteorology. Also, a method which inputs directly to the data processing system 120 is preferred for eliminating the introduction of human error.

The data processing system 120 of the inspection system 100 may include a three dimensional mapping module 122, a deviation determination module 124, a required treatment determination module 126, and a treatment control module 128. Additionally, if desired, the data processing system 120 could further include a deviation map module and a graphical user interface for mapping the deviations in print, on a screen visible to a user, or directly on the part 10. It should be understood that the various modules of the data processing system 120 may be integrated in a single data processor or may be incorporated into a plurality of data processors interconnected via a network.

The three dimensional mapping module 122 of the data processing system 120 receives the measurement data from the measurement station 110 and converts it to a three dimensional mp of the part or surface. When the measurement data comprises two dimensional digital images, the mapping module 122 uses a series of algorithms to convert the two dimensional images to a three dimensional digital description of the part or surface. This description is the equivalent of a map based on thousands of individual measurement data points. If the measurement data comprise a relatively small number of points, such as, for example, would be obtained through mechanical or hand measurement, the three dimensional description may comprise only of the measurement points. Alternatively, the mapping module 122 may use interpolation algorithms to construct a complete mathematical description of the part or surface.

The output of the mapping module 122 is a three dimensional map of the part or surface relative to the fixed reference frame. The map may comprise of a tabulation of specific points or a mathematical model or group of models.

It should be understood that the three dimensional mapping module 122 may be an integral part of the optical meteorology system used to measure the part.

The deviation determination module 124 receives the three dimensional map of the part from the mapping module 122 and uses it to calculate deviations from a standard part description. The standard part description is typically a three dimensional map of a part or surface having zero dimensional deviation from a desired ideal part or surface. The format of this three dimensional map is configured to correspond to the format of the three dimensional map constructed from part measurements by the mapping module 122. This allows for a direct comparison of the two maps to determine areas where the measured part deviates from the standard.

The standard part map may be generated based on computer aided design (CAD) files or measurements of the geometry of a mater part. Master part measurements can be made using the measurement station 110 of the inspection system 100. Other methods may also be used. Regardless of its basis, the standard part map should be constructed relative to the same fixed reference frame as the measured part map.

Using the standard part map, the deviation determination module 124 may calculate an expected position for each point of interest on the measured part or surface. A point deviation may be computed for each such point by calculating the difference between the measured point position and the expected point position along a line parallel to a predetermined axis. The expected point position divides the line into two half-lines. A positive deviation indicates that the measured point is on one half-line while a negative deviation indicates that the measured point is on the other half-line. A zero deviation indicates that the measured position of the point coincides with the expected position of the point.

Other methods of determining point deviations may also be used by the deviation determination module based on the measured and standard part maps. Point deviations may be determined for all measurement points, a subset of the measurement points or, using mathematical models, interpolated points.

The output of the deviation determination module 124 may be an array of point coordinates and associated deviations. Alternatively, the output may be a mathematical description of deviation versus point coordinate. In any embodiment, the output is preferably provided to the required treatment determination module 126 which determines, based on the reworking technology being employed in the reworking station 200, the necessary treatment procedure. Although not necessary, the data processing system 120 may further include a deviation map module which uses the output of the deviation determination module to construct a graphical representation of the deviations of the part or surface. This graphical representation may be a depiction of the three dimensional part or surface with the deviations illustrated as discrete regions or bands. These deviation regions will typically be distinguished based on color or shading, with each region having a unique color or shading pattern.

Each deviation region represents the areas of the part or surface that include measured points having point deviations in a predetermined range. The deviation map module may be programmed to establish boundaries around areas falling within these ranges. For example, deviation ranges could be defined based on 0.1 mil intervals, starting with a first interval bounding 0.0. In such a case, all points having a deviation greater than or equal to +0.15 mil but less than +0.25 mils would fall within the same deviation range. The deviation map module may establish boundaries around the areas of the surface including these points and assign the appropriate color or shading.

The resultant graphical representation may be viewed by an operator using a GUI. Alternatively, or in addition, the graphical representation may be sent to a printer to provide a hard copy. Each deviation region on the graphical representation may be presented in the same color, and may represent points which deviate from the standard part map within the same range.

Thus, the graphical representation may provide an additional visual tool that can be used to determine areas of the depicted surface that are outside a predetermined tolerance level. For example, if the acceptable tolerance level is +0.05 mils, then any region depicted in a color representing a deviation between −0.05 mils and +0.05 mils would represent the in-tolerance portion of the surface. Any other deviation regions on either the positive side or the negative side would fall in an out-of-tolerance portion. Processes such as laser forming, laser shock peening, and shot peening may be used, as will be described to affect the shape of the part.

In addition to deviation regions of the surface, the system 100 is also able to determine if there are any twist or bow defects, which will be further described, and appropriate treatments for twist and/or bow defects will be determined by the required treatment determination module 126, which need not be limited to surface treatments alone. It should also be understood that the system 100 is able to rework the part by using mechanical or thermal surface treatment, such as shot peening, laser shock peening, or laser forming. That is, while surface treatment is encompassed within the system 100, the system 100 is also able to correct such blade deviations as twist and bow. Once the blade deviations are determined, the system 100 is able, via the data processing system 120, to determine what type of treatment should be delivered to the blade or part in order to correct the deviations. Furthermore, the part or blade may be treated in one area to correct a deviation in another area.

Alternatively, the system 100 need not be provided with the deviation map module but instead the required treatment determination module 126 may directly receive the output from the deviation determination module 124 for yielding a real-time prediction of the required treatment. The required treatment determination module 126 may be pre-programmed with acceptable tolerance levels such that determinations for whether or not to rework deviation regions on the part 10 are made automatically by the required treatment determination module 126, thus reducing the need for highly skilled labor to analyze the results. The required treatment determination module 126 will then output to the treatment control module 128 which is pre-loaded with information regarding the particular dieless technology being utilized in the reworking station 200. The treatment control module 128 receives as input the output of the required treatment determination module 126 and constructs an output to the reworking system 234 for directing the reworking system 234 to provide the required treatment to the part 10 to yield the target configuration.

The reworking station 200, which may be combined with the measurement station 110 will be further described, may include a fixture 232 that assures that the part 10 is held in position in an orientation relative to a fixed reference frame that corresponds to that of the earlier positioning of the part 10 for taking surface measurement. Preferably, the measurement fixture 112 and the fixture 132 are the same so that the part 10 need not be moved during the inspection and reworking process, such as shown in FIG. 7.

The reworking system 234 may provide a dieless technology such as laser forming, laser shock peening, and shot peening as described with respect to FIGS. 1–5. In any case, the reworking system 234 will direct a reworking laser or shot 236 onto a deviation region 238 on the part 10. Alternatively, the deviation region 238 may be corrected by directing the reworking system 234 to direct a reworking laser or shot 236 at a different area than the deviation region 238 in order to correct the deviation region 238. Although the part 10 is shown as marked, because the required treatment determination module 126 makes the determination as to whether or not a deviation region will be reworked and further directs the treatment control module 128 to make the required treatment, an operator need not be provided with a visual marking of where the treatments will be placed upon the part 10.

Turning now to FIG. 7, the measurement and reworking station 400 is shown as incorporating both a digital imaging device 114 for measuring the part 10 and a reworking system 234 for modifying the part 10. Thus, the part 10 need not be moved from the fixture 112. The device 114 and the system 234 may be movable within the station 400, such as upon a track controlled by the data processing system 120, for providing optimal measuring and treatment as necessary. The part fixture 112 may be mounted on a rotating table to provide easier access for the treatment system. In the case of shot peening, a robotic arm is preferably employed to direct the shot stream.

In general, blade qualification with one of the dieless technologies, laser forming, laser shock peening, and/or shot peening, would proceed as follows: A blade is held in a fixture by its dovetail and airfoil dimensions are measured which are then compared with a master model to calculate deviations. Next, a computer simulation, also with master model information, yields real-time predictions of required surface treatments and directs shot-nozzle or laser-beam controls. Results can be quickly checked, and an iterative process can also be employed to maintain quality, reducing sensitivity to microstructural and geometric variations.

Figure 8:
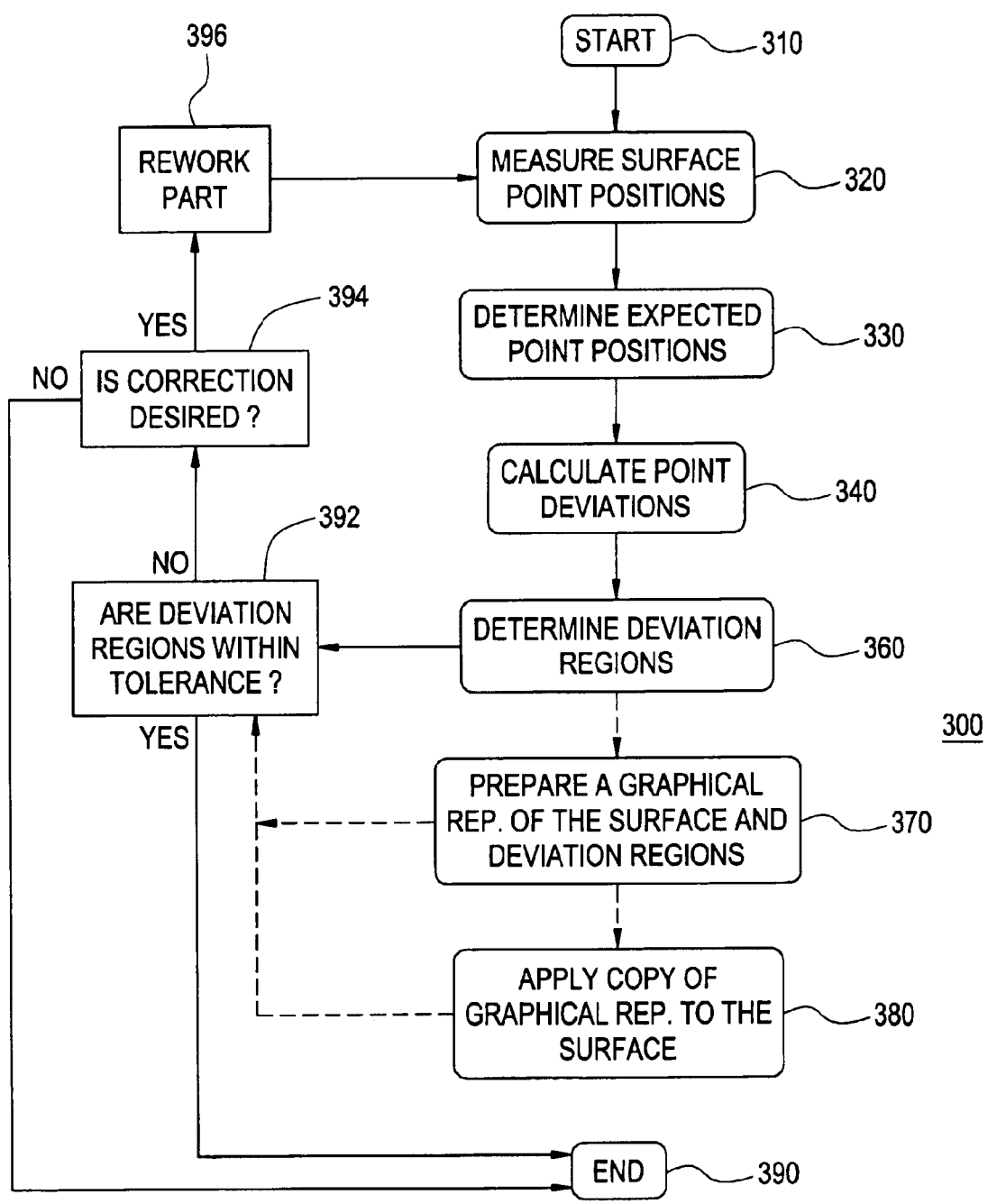
FIG. 8 shows a flow chart of the method utilized by the airfoil blade qualification systems of FIGS. 6 and 7; and, FIG. 9 shows a perspective view of an airfoil blade demonstrating warp and bow.

Turning now to FIG. 8, the method 300 for the blade qualification process that utilizes the system 100 is shown. The method 300 begins at step 310. At step 320, the measurement station 110 is used to measure the surface of the part 10. This may be accomplished by installing the part in the precision fixture 112 and obtaining measurements using the digital imaging device 114 or other measurement system. The mapping module 122 may be used to convert the measurements to a three dimensional map of the surface. Measurement information, the three dimensional surface map or both may then be sent to the deviation determination module 124. As step 330, the deviation determination module 124 determines a set of expected point positions. These expected point positions may be determined for some or all of the measured surface points, a set of interpolated surface points or a combination of measured and interpolated points. At step 340, the deviation determination module 124 calculates point deviation values for the points used to determine expected point positions. These values represent the difference between the measured point position and the expected point position along a line parallel to a predetermined axis. At step 360 the point deviations are used to determine the surface regions that include points having deviations falling within predetermined ranges.

Optional steps 370 and 380 are indicated with dotted flow lines as these steps need not be included in the method 300. At optional step 370, a graphical representation of the surface may be prepared. This graphical representation depicts the topology of the surface with the deviation regions illustrated using color bands, shading, or other graphical means. The graphical representation may be displayed to an operator using the GUI of the data processing system 120. The operator can visually inspect the part by viewing the graphical representation. At optional step 380, a copy of the graphical representation may be applied directly to the surface of the part. This may be accomplished by installing the part into the fixture 132 and using a marking system to mark the part with the graphical representation. After either optional steps 370 and 380, the flow of method 300 will continue to step 392.

If optional steps 370 and 380 are not used in the method 300, then the flow will follow from step 360 directly to step 392. At step 392, the required treatment determination module 126 will determine whether or not the deviation regions are within a programmed tolerance. If the answer is yes, then the program will end and no treatment will be provided to the part 10. If the answer is no, then the flow of method 300 will lead to step 394. At step 394, the required surface determination module 126 will determine if correction is even desired. That is, the part 10 may be so far beyond the acceptable regions that reworking would not be desired and the part would be scrapped. In another example, the part may have deviation regions that are too far in the negative tolerance zones which would not be able to be corrected using peening or laser forming methods. In another example, the part 10 may have bow or twist defects which are determined to be beyond an acceptable correctable range. Thus, if correction of the part 10 is not desired, flow will follow to step 390 where the part measurement and reworking will end. If correction of the part 10 is still desired, then the flow of method 300 will continue to step 396. The treatment control module 128 will direct whatever treatment is required onto the part 10 using reworking system 234. After the part 10 is reworked to the required specifications, then the flow of the method 300 will continue to step 320 where the part 10 is remeasured and deviation regions are recalculated. If the part is within tolerance, then the method will end at step 390 as previously described.

Figure 9:
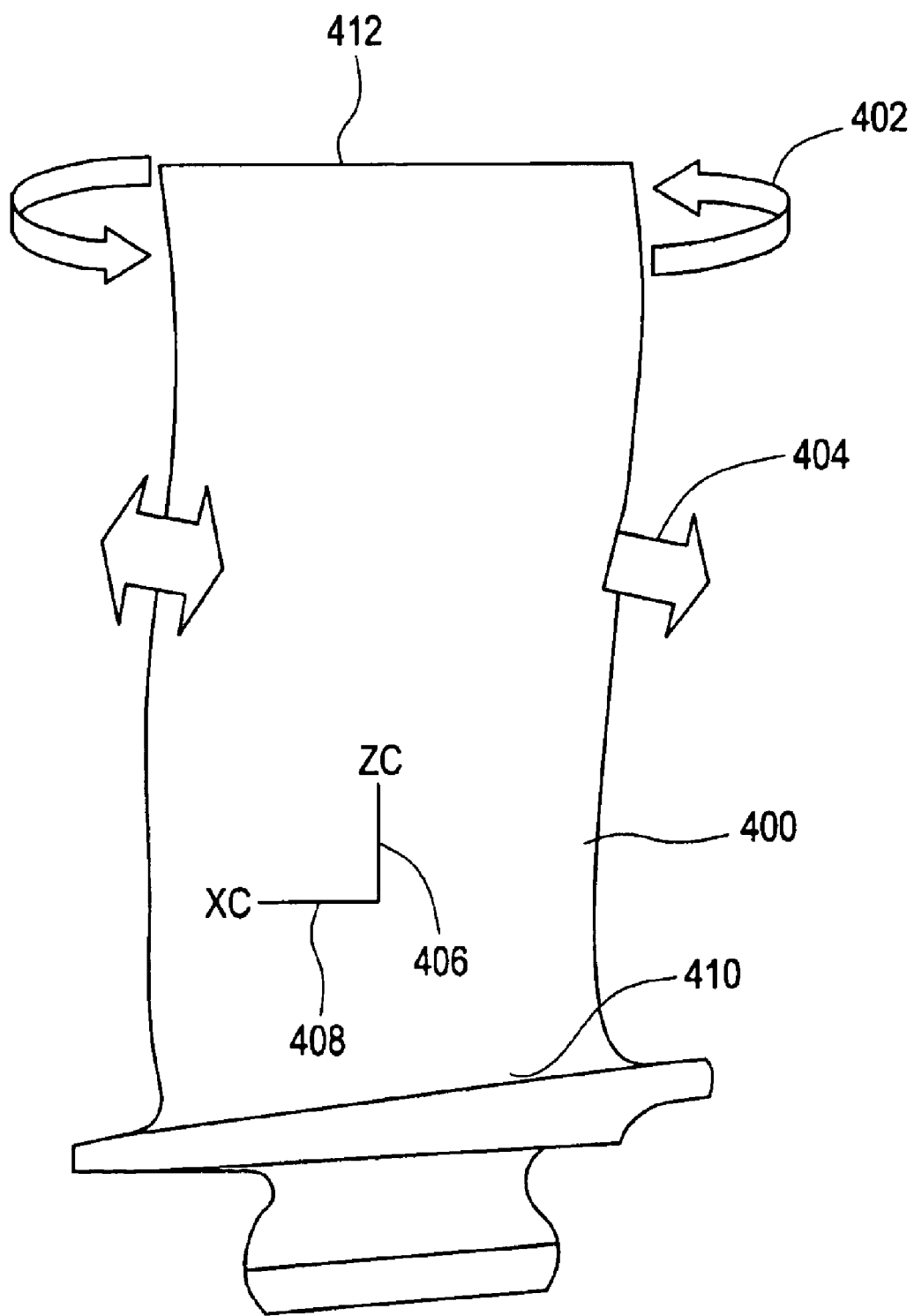

Turning now to FIG. 9, an example of an airfoil blade 400 is shown with exemplary warp 402 and bow 404 defects. A warp defect occurs when the blade twist (from root 410 to tip 412 of the blade 400) is out of tolerance. Treatment on a vertical axis 406 can correct warp defects. A bow defect occurs when the plane of the blade is bent out of tolerance. Treatment on a horizontal axis 408 can correct bow defects. As FIG. 9 demonstrates, blade deviation typically exhibits the dominant modes of twist and/or bow. Twisting deviations can be managed via treatments on a vertical axis, whereas bow deviations require treatments weighted on the horizontal axis. It should be understood that bow and warp modes are provided as examples, and that other deviation modes and correction strategies are within the scope of this system and method. In view of this, a noted advantage of this system is that a deviation observed at a region A (any region in the blade 400 which is determined to have a deviation) may be effectively corrected by applying a treatment to a separate region B (as determined by the required surface treatment determination module 126). This relationship may not be readily obvious even to a skilled artisan, and therefore the treatments must be designed either by a priori analysis or by a learning period if driven by neural net processes. Again, this is accomplished via the data processing system 120.

The combination of automatic measurement and dieless forming processes will allow blade qualification that is fast, automatic, and minimizes the requirement for highly skilled labor thus advantageously benefiting the aircraft industry.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for qualifying a part, the method comprising:

(a) taking digital measurements of the part;

(b) comparing the digital measurements of the part with measurements of a target model;

(c) calculating deviations between the digital measurements of the part and the measurements of the target model;

(d) determining a required treatment for the part to conform with the measurements of the target model;

(e) directing a reworking system to provide the required treatment to the part; and, (f) repeating steps (b) through (e) until step (d) determines that no further treatment is required.

2. The method of claim 1 wherein directing a reworking system comprises performing a mechanical surface treatment on the part.

3. The method of claim 1 wherein directing a reworking system comprises performing a thermal surface treatment on the part.

4. The method of claim 3 wherein the thermal surface treatment comprises laser forming.

5. The method of claim 1 wherein taking digital measurements comprises employing an optical based digital imaging device.

6. The method of claim 1 further comprising the step of securing the part into a fixture prior to step (a), wherein the part is not removed from the fixture until the step (d) determines that no further treatment is required.

7. The method of claim 1 further comprising factoring in an acceptable tolerance level into the step of determining a required treatment.

8. An part qualification system comprising:

a measurement station having means for obtaining spatial position data relative to a fixed reference frame for each of a plurality of points on a surface of a part;

a data processing system in communication with the means for obtaining spatial position data, the data processing system having means for receiving the spatial position data and for determining a point deviation from a surface standard point for each of at least a portion of the plurality of surface points and means for determining a required treatment of the part; and, a reworking station having means for directing treatments to the surface of the part in response to input from the data processing system.

9. The part qualification system of claim 8 wherein the reworking station is combined with the measurement station.

10. The part qualification system of claim 9 wherein the measurement station and the reworking station includes a common fixture for holding the part during measuring and reworking.

11. The part qualification system of claim 8 wherein the means for directing treatments comprises a peening machine.

12. The part qualification system of claim 8 wherein the means for directing treatments includes at least one of a laser shock peening machine and a laser forming machine.

13. The part qualification system of claim 8 wherein the data processing system is in digital communication with the measurement station and the reworking station.

14. An airfoil qualification system for measuring and reworking an airfoil, the system comprising:

a measurement and reworking station including a measuring system configured to obtain spatial position data relative to a fixed reference frame for each of a plurality of points on the surface and further including a treatment system for directing altering treatments to the airfoil;

a data processing system in communication with the measuring and reworking station, the data processing system including:

a mapping module programmed to use the spatial position data to form a three dimensional map of the surface;

a deviation determination module programmed to determine a point deviation for each of at least a portion of the plurality of surface points;

a required treatment determination module for calculating necessary treatments for bringing the airfoil in conformance with a target model; and, a treatment control module for providing instructions to the treatment system in the measurement and reworking station.

15. The airfoil qualification system of claim 14 wherein the measurement and reworking station includes a fixture configured to secure the airfoil in a predetermined orientation with respect to the fixed reference frame.

16. The airfoil qualification system of claim 14 wherein the treatment system is a peening machine.

17. The airfoil qualification system of claim 14 wherein the treatment system includes a laser.

18. The airfoil qualification system of claim 14 wherein the required treatment determination module further determines whether the airfoil is over tolerance by a programmed amount and thus will not receive further treatment.

19. The airfoil qualification system of claim 14 wherein the measuring system includes an optical based digital imaging device in digital communication with the data processing system.

20. The airfoil qualification system of claim 14 wherein a deviation in one portion of the airfoil is determined by the required treatment determination module to be correctable via treatment of a different portion of the airfoil.

21. The method of claim 2, wherein the mechanical surface treatment comprises laser shock peening.

22. The method of claim 3, wherein the thermal surface treatment comprises shot peening.

23. The method of claim 1, wherein the part comprises an airfoil.

24. The method of claim 23, wherein the part comprises an airfoil blade.

25. The part qualification system of claim 8, wherein the part comprises an airfoil.

* * * * *